(12) United States Patent
Turner et al.

(10) Patent No.: US 11,465,170 B2
(45) Date of Patent: *Oct. 11, 2022

(54) DISPENSING CONTROL SYSTEM, METHOD OF CONTROLLING A DISPENSING DEVICE AND COMPUTER PROGRAM

(71) Applicant: Sulzer Mixpac AG, Haag (CH)

(72) Inventors: Hayden Turner, Ayer, MA (US); Victor Clemens, Buchs (CH)

(73) Assignee: MEDMIX SWITZERLAND AG, Haag (CH)

( * ) Notice: Subject to any disclaimer, the term of this patent is extended or adjusted under 35 U.S.C. 154(b) by 101 days.

This patent is subject to a terminal disclaimer.

(21) Appl. No.: 17/059,668

(22) PCT Filed: Jun. 28, 2019

(86) PCT No.: PCT/EP2019/067321
§ 371 (c)(1),
(2) Date: Nov. 30, 2020

(87) PCT Pub. No.: WO2020/002596
PCT Pub. Date: Jan. 2, 2020

(65) Prior Publication Data
US 2021/0197226 A1 Jul. 1, 2021

Related U.S. Application Data

(63) Continuation of application No. 16/023,827, filed on Jun. 29, 2018, now Pat. No. 10,894,272.

(30) Foreign Application Priority Data

Sep. 17, 2018 (EP) .................................... 18194794

(51) Int. Cl.
*B05C 17/005* (2006.01)
*B05C 17/01* (2006.01)
(Continued)

(52) U.S. Cl.
CPC .......... *B05C 17/00596* (2013.01); *A61C 5/64* (2017.02); *A61C 9/0026* (2013.01);
(Continued)

(58) Field of Classification Search
CPC . B05C 17/00596; B05C 17/0103; A61C 5/64; A61C 9/0026; H04W 4/80; H04B 1/02; H04B 1/06
(Continued)

(56) References Cited

U.S. PATENT DOCUMENTS 5,946,603 A  8/1999  Ibanez-Meier et al.
6,135,949 A  10/2000  Russo et al.
(Continued)

FOREIGN PATENT DOCUMENTS

CA   295905 A1   12/1929
CA   2762731 A1   5/2013
(Continued)

OTHER PUBLICATIONS

Extended European Search report dated Feb. 28, 2019 in corresponding European Patent Application No. 18194794.6, filed Sep. 17, 2018.

*Primary Examiner* — Paul R Durand
*Assistant Examiner* — Michael J. Melaragno
(74) *Attorney, Agent, or Firm* — Global IP Counselors, LLP

(57) ABSTRACT

A dispensing control system includes a dispensing device and a remote device. The dispensing device includes a dispenser configured to dispense material from a cartridge disposed in the dispensing device, a first receiver configured to receive information related to the cartridge, a transmitter configured to transmit the information related to the cartridge, and an electronic controller configured to cause the transmitter of the dispensing device to transmit the infor-
(Continued)

mation related to the cartridge. The remote device includes an electronic controller, a receiver and a transmitter, the receiver of the remote device is configured to receive the information related to the cartridge, the controller of the remote device is configured to monitor the information related to the cartridge and to cause the transmitter of the remote device to transmit the information related to the cartridge to a remote server.

42 Claims, 10 Drawing Sheets

(51) Int. Cl.
    *A61C 9/00*         (2006.01)
    *H04W 4/80*       (2018.01)
    *H04B 1/02*         (2006.01)
    *H04B 1/06*         (2006.01)
    *A61C 5/64*         (2017.01)

(52) U.S. Cl.
    CPC ........... *B05C 17/0103* (2013.01); *H04B 1/02* (2013.01); *H04B 1/06* (2013.01); *H04W 4/80* (2018.02)

(58) Field of Classification Search
    USPC .......................................................... 222/52
    See application file for complete search history.

(56) References Cited

U.S. PATENT DOCUMENTS

| | | |
|---|---|---|
| 6,267,297 B1 | 7/2001 | Contadini et al. |
| 6,554,203 B2 | 4/2003 | Hess et al. |
| 6,631,829 B1 | 10/2003 | Wagner et al. |
| 6,677,852 B1 | 1/2004 | Landt |
| 7,638,042 B2 | 12/2009 | Astle et al. |
| 7,900,799 B2 | 3/2011 | Kuzar et al. |
| 8,325,045 B2 | 12/2012 | Dattolo et al. |
| 8,352,089 B2 | 1/2013 | Beebe |
| 8,584,907 B2 | 11/2013 | Schneider et al. |
| 8,684,229 B2 | 4/2014 | Harre et al. |
| 8,807,394 B2 | 8/2014 | Broyles et al. |
| 9,095,872 B2 | 8/2015 | Topf et al. |
| 9,120,115 B2 | 9/2015 | Beal et al. |
| RE46,143 E | 9/2016 | Erman et al. |
| 9,452,234 B2 | 9/2016 | Conroy et al. |
| 9,731,258 B2 | 8/2017 | Janssen et al. |
| 9,965,594 B2 | 5/2018 | Portney |
| 10,758,935 B2* | 9/2020 | Beebe .................... H04L 67/02 |
| 10,894,272 B2* | 1/2021 | Turner ................. A61C 9/0026 |
| 2003/0080152 A1 | 9/2003 | Balcome et al. |
| 2004/0025871 A1 | 2/2004 | Davies |
| 2005/0119604 A1 | 6/2005 | Bonney et al. |
| 2006/0037970 A1 | 2/2006 | Fazzio et al. |
| 2007/0020580 A1 | 1/2007 | Harre et al. |
| 2010/0222921 A1 | 9/2010 | Harre et al. |
| 2011/0063106 A1 | 3/2011 | Snodgrass |
| 2011/0073613 A1* | 3/2011 | Beebe ................... G01F 11/029 222/1 |
| 2011/0082595 A1 | 4/2011 | Mehus et al. |
| 2011/0089260 A1 | 4/2011 | Van Roemburg |
| 2011/0245983 A1 | 10/2011 | Beebe |
| 2011/0245984 A1 | 10/2011 | Beebe |
| 2012/0209243 A1* | 8/2012 | Yan .......................... B05B 1/205 700/231 |
| 2012/0329438 A1 | 12/2012 | Snodgrass |
| 2013/0020350 A1 | 1/2013 | Gardos et al. |
| 2013/0204202 A1 | 8/2013 | Trombly et al. |
| 2013/0265138 A1 | 10/2013 | Nielsen et al. |
| 2014/0092704 A1 | 4/2014 | Janssen et al. |
| 2014/0228783 A1 | 8/2014 | Kraft |
| 2014/0263423 A1 | 9/2014 | Akdogan et al. |
| 2015/0028051 A1 | 1/2015 | Topf et al. |
| 2015/0266050 A1* | 9/2015 | Beckett ............... B05C 17/0103 222/310 |
| 2015/0336689 A1 | 11/2015 | Brown, II et al. |
| 2015/0359667 A1* | 12/2015 | Brue ..................... A61F 9/0008 604/295 |
| 2016/0107187 A1* | 4/2016 | Beebe ................... B05C 17/014 222/1 |
| 2016/0169446 A1 | 6/2016 | Peters et al. |
| 2016/0257554 A1 | 9/2016 | Manwani et al. |
| 2017/0100738 A1 | 4/2017 | Kendziorek et al. |
| 2017/0119918 A1 | 5/2017 | Lima et al. |
| 2017/0157638 A1* | 6/2017 | Beebe ............... B05C 17/00553 |
| 2017/0189930 A1* | 7/2017 | Turner ............. B05C 17/00553 |
| 2017/0193191 A1 | 7/2017 | Blum et al. |
| 2017/0208920 A1 | 7/2017 | Thiebaut et al. |
| 2017/0216519 A1 | 8/2017 | Vouillamox et al. |
| 2018/0001338 A1* | 1/2018 | Beebe ................. B05C 17/0103 |
| 2018/0078967 A1 | 3/2018 | Turner et al. |
| 2018/0236181 A1 | 8/2018 | Marlin et al. |
| 2020/0001320 A1* | 1/2020 | Turner ............. B05C 17/00596 |
| 2021/0197226 A1* | 7/2021 | Turner ................ B05C 17/0103 |

FOREIGN PATENT DOCUMENTS

| | | | |
|---|---|---|---|
| DE | 10 2006 043 710 A1 | 3/2008 | |
| EP | 1736113 B1 | 12/2006 | |
| EP | 1834603 A1 | 9/2007 | |
| EP | 2102076 B1 | 10/2011 | |
| EP | 2382941 A1 | 11/2011 | |
| EP | 2433656 A1 | 3/2012 | |
| EP | 2923774 A1 | 9/2015 | |
| EP | 3209431 B1 * | 1/2022 | ......... B05C 17/0103 |
| FR | 2762731 A1 | 10/1998 | |
| WO | 2005/104773 A1 | 11/2005 | |
| WO | 2005/113420 A2 | 12/2005 | |
| WO | 2007/121003 A2 | 10/2007 | |
| WO | 2008/014117 A2 | 1/2008 | |
| WO | 2009/097892 A1 | 8/2009 | |
| WO | 2016/033507 A2 | 3/2016 | |
| WO | 2017/079845 A1 | 5/2017 | |
| WO | 2017/092884 A1 | 6/2017 | |
| WO | 2017/096205 A1 | 6/2017 | |
| WO | WO-2020002596 A1 * | 1/2020 | ............... A61C 5/62 |

* cited by examiner

DISPENSING CONTROL SYSTEM, METHOD OF CONTROLLING A DISPENSING DEVICE AND COMPUTER PROGRAM

CROSS-REFERENCE TO RELATED APPLICATION

This application is a U.S. National Stage application of International Application No. PCT/EP2019/067321, filed Jun. 28, 2019, which claims priority to U.S. patent application Ser. No. 16/023,827, filed Jun. 29, 2018 and European Patent Application No. 18194794.6, filed Sep. 17, 2018, the contents of each of which are hereby incorporated herein by reference.

BACKGROUND

Field of the Invention

The present invention generally relates to a dispensing control system. In particular, the present invention relates to a dispensing control system capable of remotely monitoring a dispensing device.

Background Information

In the construction and dental sectors, cartridges are frequently used to dispense liquids, for example, sealing components, components for chemical dowels or chemical anchors, adhesives, pastes or impression materials in the dental sector.

Conventional dispensers can be single-component systems in which the material to be dispensed is formed from one component and two-component or multicomponent systems in which at least two different components are stored in separate chambers of the same cartridge or in separate cartridges. The two-component or multicomponent systems, the components are mixed by a dynamic or static mixing apparatus. Examples of multicomponent systems include adhesives or chemical dowels which only harden after the mixing of the two components. Two-component systems can also be used in the industrial sector for paints which are often used to generate functional protective layers such as for corrosion protection.

Further prior art dispensers are known from US2017/119918A1; US2018/236181A1; US2014/263423A1; US2011/082595A1; US2016/169446A1; WO2017/096205A1; US2011/245983A1; US2011/245984A1; and EP2923774A1.

SUMMARY

It has been found that it is desirable to have additional control and oversight of dispensing devices. One object of the present disclosure is to provide a dispensing control system that is capable of being monitored and controlled by a remote device.

This object is satisfied by a dispensing control system in accordance described herein. Such a dispensing control system, comprises:
a dispensing device including a dispenser comprising one or more pushrods and an actuation mechanism configured to entrain the one or more pushrods in the direction of a cartridge to actuate one or more pistons arranged within said cartridge for dispensing material from the cartridge that is disposed in the dispensing device, a first wireless communication means that is configured to transmit data between said cartridge when received within the dispenser and the dispenser, the first wireless communication means comprising a first receiver arranged at the dispenser and configured to receive information related to the cartridge, with said information being stored at said cartridge, and a second wireless communication means that is configured to transmit data between the dispenser and a controller of a remote device, the second wireless communication means comprising a transmitter configured to transmit the information related to the cartridge, and an electronic controller configured to cause the transmitter of the dispensing device to transmit the information related to the cartridge; and a remote device including said controller, the remote device comprising a receiver and a transmitter of the second wireless communication means, the receiver of the remote device being configured to receive the information related to the cartridge, the controller of the remote device being configured to monitor the information related to the cartridge and to cause the transmitter of the remote device to transmit the information related to the cartridge to a remote server, wherein the first receiver is configured to receive a signal different from a signal received by the remote device.

In view of the state of the known technology, one aspect of the present disclosure is to provide a dispensing control system, comprising a dispensing device and a remote device. The dispensing device includes a dispenser configured to dispense material from a cartridge disposed in the dispensing device, a first receiver configured to receive information related to the cartridge, a transmitter configured to transmit the information related to the cartridge, and an electronic controller configured to cause the transmitter of the dispensing device to transmit the information related to the cartridge. The remote device includes an electronic controller, a receiver and a transmitter, the receiver of the remote device is configured to receive the information related to the cartridge, the controller of the remote device is configured to monitor the information related to the cartridge and to cause the transmitter of the remote device to transmit the information related to the cartridge to a remote server.

In view of the state of the known technology, another aspect of the present disclosure is to provide a method of controlling a dispensing device, the method comprising receiving information with a first receiver on the dispensing device, the information related to a cartridge disposed in the dispensing device, transmitting, via a first transmitter, the information related to the cartridge to a second receiver on remote handheld device, and transmitting, via a second transmitter, the information related to the cartridge from the remote handheld device to a remote server.

In view of the state of the known technology, another aspect of the present disclosure is to provide a computer program embodied on a non-transitory computer-readable medium for controlling and operating a dispensing device, the computer program, when executed by an electronic controller, configured to monitor information received from a transmitter on the dispensing device, the information related to a cartridge disposed in the dispensing device, configured to cause the information related to the cartridge to be transmitted to a remote server, and configured to cause instructions to be transmitted to the dispensing device based on the information related to a cartridge, the instructions including information related to dispensing a material in the cartridge.

Another aspect (a first aspect) of the present invention relates to an electric dispenser for dispensing material from a cartridge, the electric dispenser being configured to receive a cartridge, the electric dispenser comprising one or more pushrods;

an actuation mechanism configured to entrain the one or more pushrods in the direction of the cartridge to actuate a piston arranged within said cartridge for dispensing material from said cartridge;

a first wireless communication means that is configured to transmit data between said cartridge when received within the electric dispenser and the electric dispenser; and a second wireless communication means that is configured to transmit data between the electric dispenser and a control system, preferably a remote control system (e.g., a remote device or network computer or server);

wherein the first wireless communication means are different from the second wireless communication means. By such a dispenser a user can automatically determine the contents of the cartridges as these can be read out by the first wireless communication means and be forwarded to the control system by means of the second wireless communication means. By forming the first communication means different from the second wireless communication means the respective wireless communication means can be tailored to their use. For example, the first wireless communication means merely requires a communication to be possible over short distances of less than 50 cm, whereas the second wireless communication means should be able to communicate error free over larger distances of 50 cm or more.

A second aspect of the present invention relates to the electric dispenser in accordance with the first aspect, wherein the first wireless communication means comprises RFID and the second wireless communication means is selected from the group of members consisting of: Bluetooth, wireless lan, NFC, zigbee, LTE, UMTS, Z-Wave and infrared.

A third aspect of the present invention relates to the electric dispenser in accordance with the first or second aspect, wherein the second wireless communication means is configured to communicate parameters on a current state of use of the electric dispenser and/or parameters relating to the environment of use of the electric dispenser between the electric dispenser and the control system; and/or parameters relating to the contents of the cartridge that are communicated between the cartridge and the electric dispenser via the first communication means.

A fourth aspect of the present invention relates to the electric dispenser in accordance with at least one of the preceding aspects, wherein the control system is a remote control system that is separate from the electric dispenser.

A fifth aspect of the present invention relates to the electric dispenser in accordance with at least one of the preceding aspects, wherein the control system is selected from the group of members consisting of: a mobile phone, a smart phone, a tablet, a smart watch, a personal computer, a portable computer, a microcontroller and an APP installed on at least one of the aforementioned devices.

A sixth aspect of the present invention relates to the electric dispenser in accordance with at least one of the preceding aspects, further comprising the control system, wherein the control system stores data of at least one of the cartridge and of the electric dispenser and is configured to communicate this data to and from a cloud storage space.

A seventh aspect of the present invention relates to the electric dispenser in accordance with the sixth aspect wherein the control system further comprises a third communication means for communicating the data between the cloud storage space and the control system.

An eighth aspect of the present invention relates to the electric dispenser in accordance with the sixth or seventh aspect, wherein the control system is configured to asynchronously communicate the data between the control system and the cloud storage space.

A ninth aspect of the present invention relates to the electric dispenser in accordance with at least one of the preceding aspects, further comprising a temperature sensor that is arranged at the electric dispenser and that is configured to detect temperature data relating to a temperature of the environment in which the electric dispenser is used, with the temperature data optionally being communicated to the remote control via the second communication means.

A tenth aspect of the present invention relates to the electric dispenser in accordance with at least one of the preceding aspects, further comprising a humidity sensor that is arranged at the electric dispenser and that is configured to detect humidity data relating to a humidity of the environment in which the electric dispenser is used, with the humidity data optionally being communicated to the remote control via the second communication means.

An eleventh aspect of the present invention relates to the electric dispenser in accordance with the ninth or the tenth aspect, comprising one or more further sensors.

A twelfth aspect of the present invention relates to the electric dispenser in accordance with eleventh aspect, wherein the one or more further sensors are configured to determine parameters relating to a current state of use of the electric dispenser and/or of the cartridge respectively of contents stored in the cartridge.

A thirteenth aspect of the present invention relates to the electric dispenser in accordance with the eleventh aspect or the twelfth aspect, wherein the one or more further sensors is selected from the group of members consisting of a pressure sensor, a location sensor—in particular a GPS sensor—a gyroscopic sensor, a weight sensor, a strain sensor and combinations of the foregoing.

A fourteenth aspect of the present invention relates to the electric dispenser in accordance with at least one of the preceding aspects, wherein the data communicated between the control device and the electric dispenser comprises operating data by which an operation of the electric dispenser can be adapted and/or controlled in view of data transmitted between the cartridge and the electric dispenser.

A fifteenth aspect of the present invention relates to the electric dispenser in accordance with at least one of the preceding ninth aspects to fourteenth aspects, wherein the data communicated between the control device and the electric dispenser comprises operating data by which an operation of the electric dispenser can be adapted and/or controlled in view of data transmitted between the cartridge and the electric dispenser and in dependence on parameters determined by one of the sensors.

A sixteenth aspect of the present invention relates to a system comprising an electric dispenser, one or more cartridges, a remote control system and a cloud storage device, with the electric dispenser being configured to receive the one or more cartridges, the electric dispenser comprising one or more pushrods and an actuation mechanism configured to entrain the one or more pushrods in the direction of the cartridge to actuate a piston arranged within the cartridge for dispensing material from the cartridge, the electric dispenser further comprising a first wireless communication means that is configured to transmit data between the cartridge when received within the electric dispenser and the electric dispenser; and the electric dispenser further includes a second wireless communication means that is configured to transmit data between the electric dispenser and the control system and that is different from the first wireless communication means, wherein the remote control system is configured to transmit data between the remote control system and the cloud storage device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
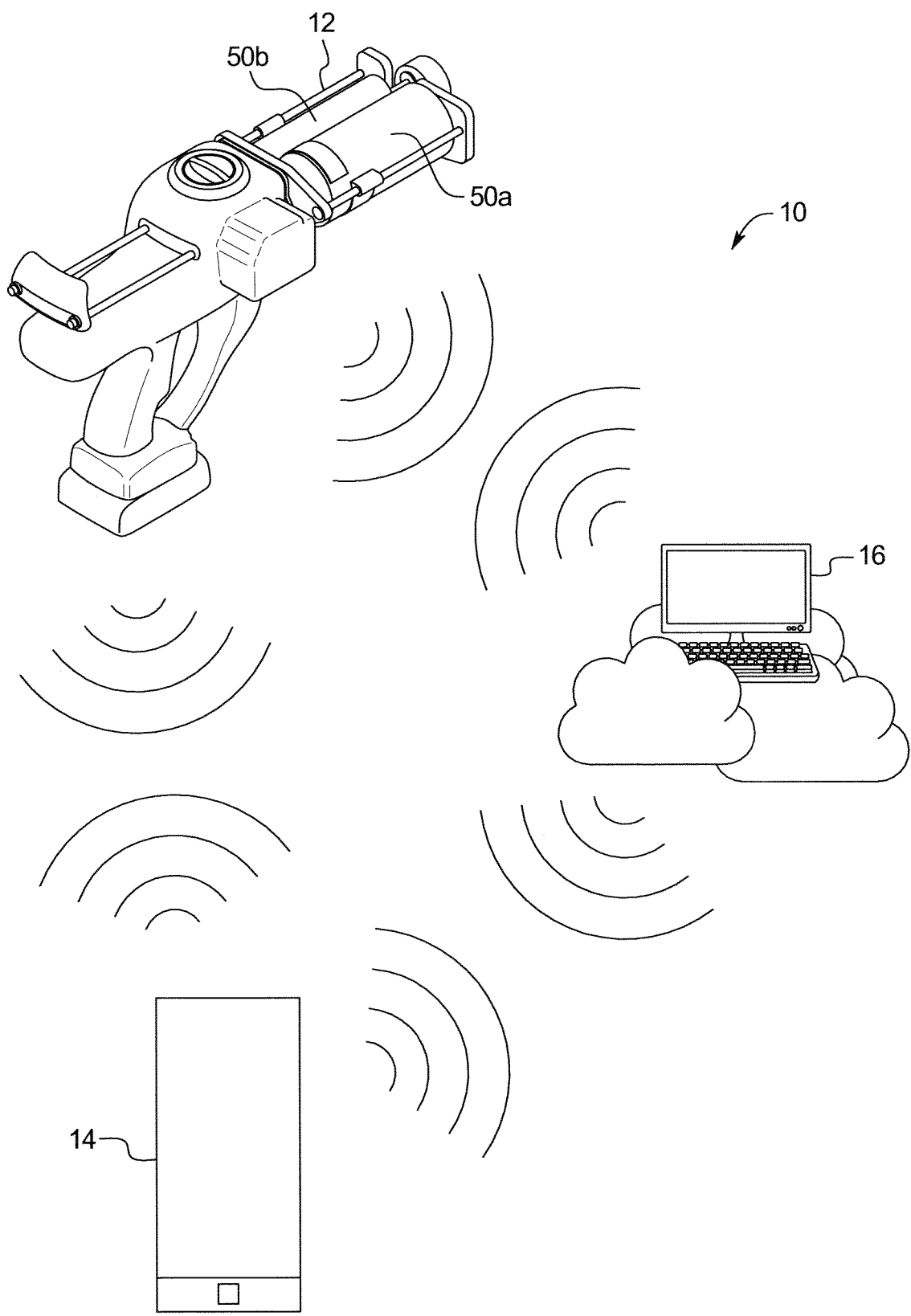
FIG. 1 illustrates a dispensing control system according to one embodiment of the present invention.

Referring initially to FIG. 1, a dispensing control system 10 according to an embodiment of the present invention is shown. FIG. 1 illustrates the dispensing control system 10 which includes a handheld dispensing device (dispenser 12), a remote device 14 and a network terminal or server 16.

As is illustrated in FIG. 1, the dispenser 12 is capable of sending and receiving information wirelessly directly to both the remote device 14 and/or the remote network terminal or server 16 (e.g., the cloud). Moreover, the remote device 14 is capable of sending and receiving information wirelessly directly to both the dispenser 12 or the remote network terminal or server 16 (e.g., the cloud). The remote network terminal or server 16 is capable of sending and receiving information wirelessly directly to both the dispenser 12 or the remote device 14.

Figure 2:
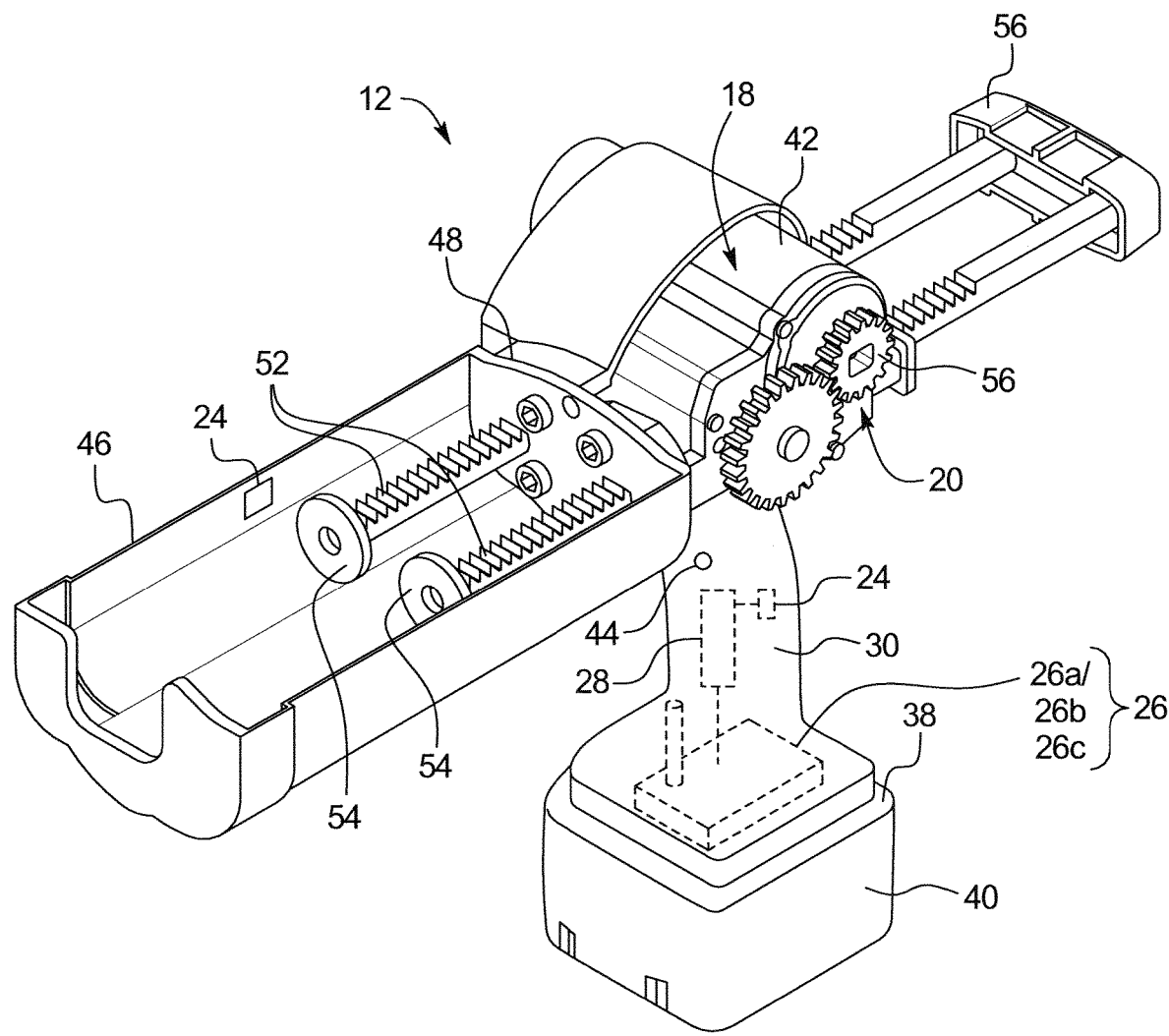
FIG. 2 illustrates the dispenser of FIG. 1 with a receiver/transmitter shown.
Figure 3:
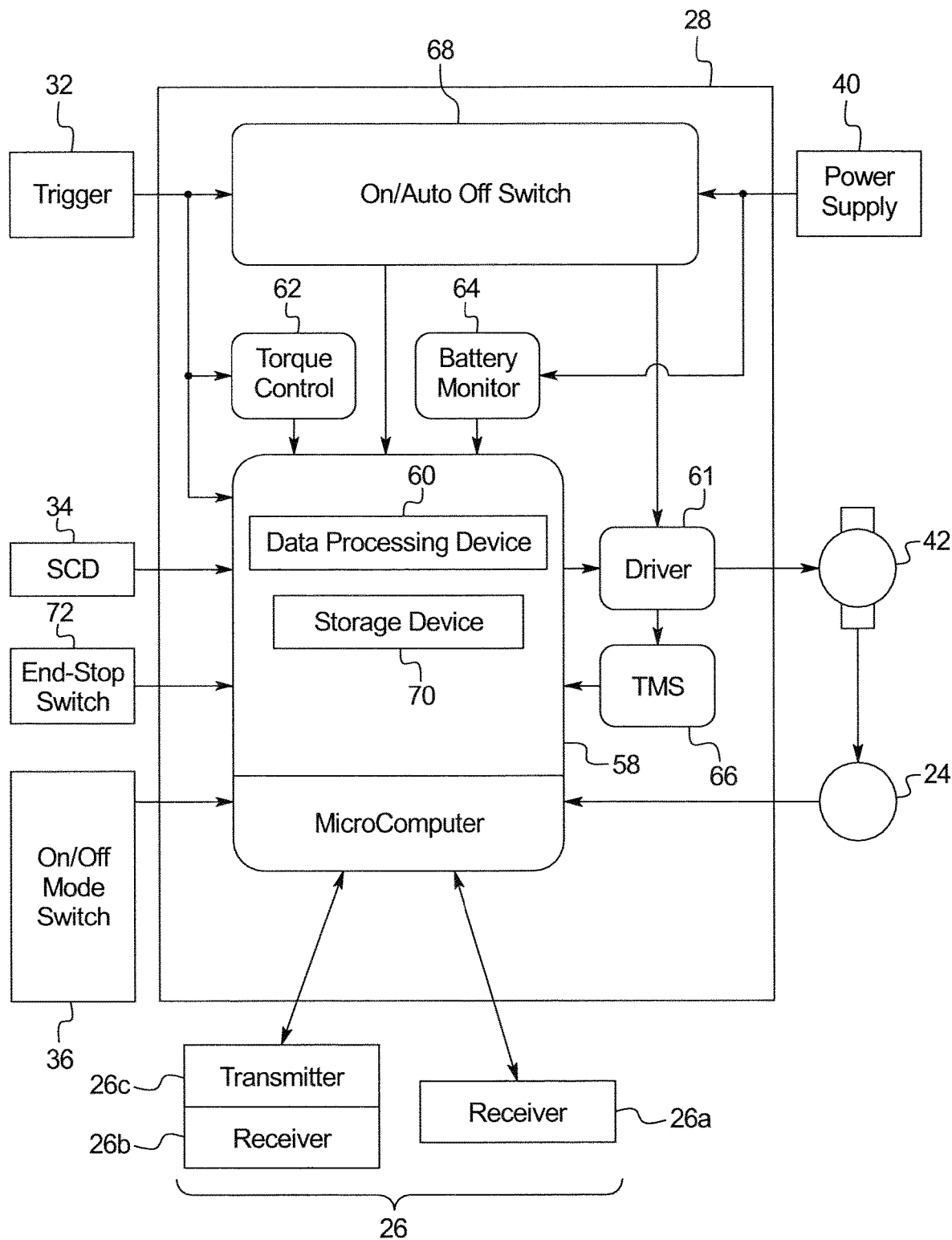
FIG. 3 is a schematic of the dispenser of FIG. 2.

Referring to FIGS. 2 and 3, the dispenser 12 is illustrated in accordance with one embodiment. In this embodiment, the dispenser 12 is an electric dispenser and includes a housing 18, a drive unit 20 (also known as an actuation mechanism), a motor, material dispensers 54, sensors 24, a receiver/transmitter 26 and a controller 28.

The housing 18 includes a handle 30 for gripping by an operator for operating the dispenser 12 to dispense material. The handle 30 includes a trigger switch or trigger 32, a speed control dial (SCD) 34 and an operation mode selection switch in the form of an on/off mode switch 36 (see FIG. 3 in this regard). The housing 18 accommodates the drive unit 20 and the controller 28. At the bottom 38 of the housing 18, a rechargeable battery pack or power supply 40 is attached in a manner normal for portable electric tools.

Alternatively, the dispenser 12 may include a cord for connection with a power supply such as a power outlet. As is understood, the power supply 40 (e.g., the battery) supplies a voltage to the drive unit or actuation mechanism 20 to operate the dispenser 12.

An indicator 44 can be disposed on the handle 30 for indicating specific conditions. In other words, the indicator 44 may be an LED that indicates one or more of a number of specific conditions such as, temperature, pressure, first dispensing mode activated, second dispensing mode activated, low or full battery charge, overload (torque), high temperature, end-stop switch activated, etc. The indicator 44 can be any other suitable indicator or display to can display any suitable information.

A holder 46 is disposed at a front end 48 of the housing 18 to receive a receptacle for material to be dispensed. Thus, the holder 46 defines the front end 48 of the dispenser 12. The receptacle for material can be of any kind, but is preferable a cartridge 50 (see FIG. 5) as described herein, but can be any suitable receptacle, such as a sausage type receptacle, or any other suitable type of receptacle. The material to be dispensed can be any type of sealant or adhesive. For example, the sealant can be any ordinary one-component silicone. The curing of the silicone starts with the normal moisture that is present in the surrounding atmosphere. Alternatively, the material can be a two-component materials, such as polyesters, polyurethanes, epoxy or epoxy acrylate. These materials can be used as adhesives, putties or also as sealants.

The dispenser 12 further comprises a rack 52. At the front end of the rack 52 is at least one material dispenser 54. In one embodiment, the material dispenser 54 is a first material dispenser of a first material dispenser and a second material dispenser, with each of the material dispensers 54 being a plunger (connected to a pushrod) configured to be inserted into a respective receptacle of the cartridge 50. The material dispensers 54 are configured to drive and dispense the material from the cartridge via not shown pistons received in the cartridge. Although the material dispensers 54 are illustrated as plungers, the material dispensers 54 can be any suitable devices. The rack 52 extends through the drive unit 20, and at a rear end opposite the front end the rack 52, a second handle 56 is attached.

Figure 5:
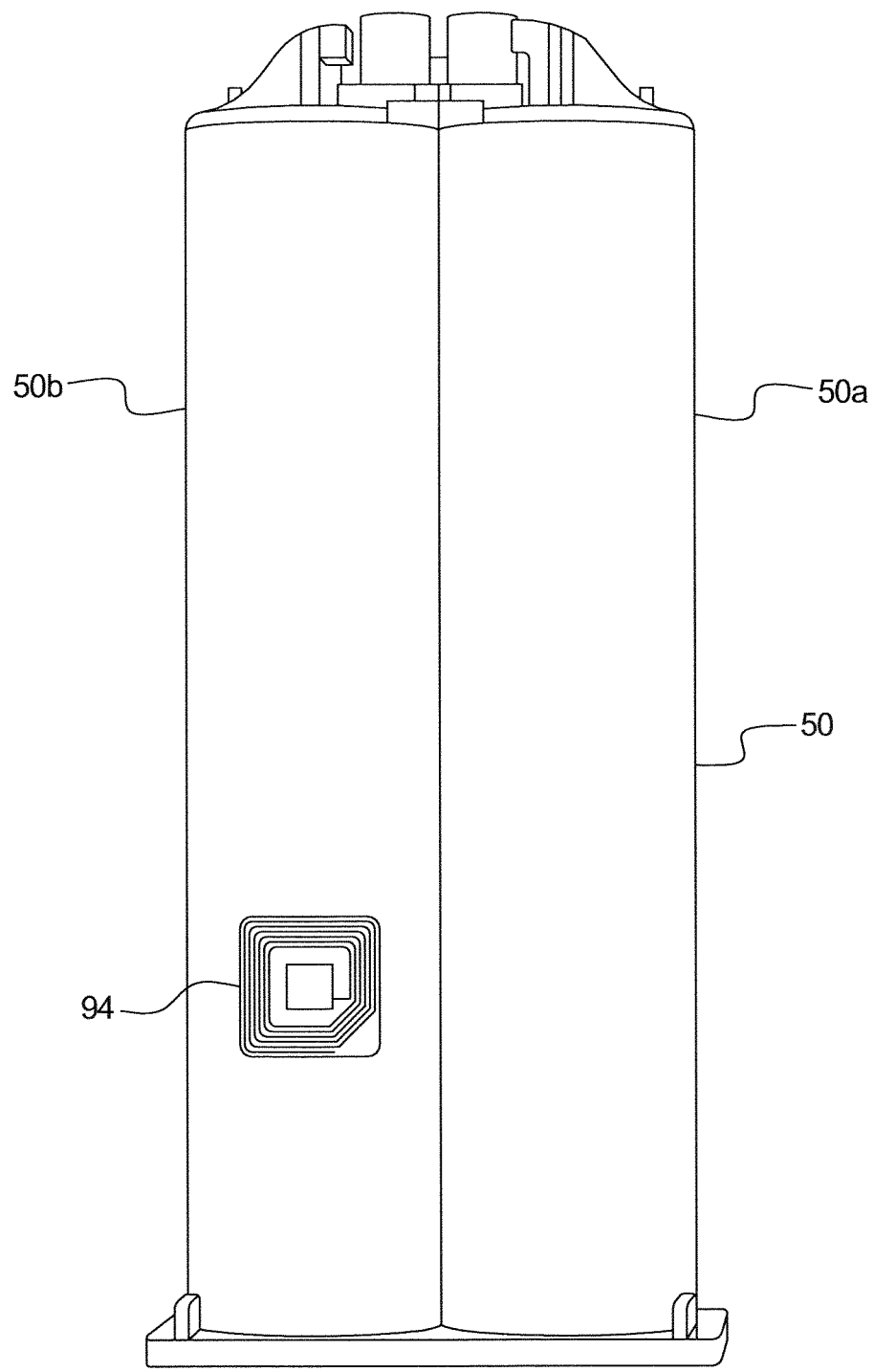
FIG. 5 is a schematic of the remote device of FIG. 1.

Since the first and second material dispensers 54 are connected through the second handle 56 of the rack 52, the first and second material dispensers 54 move in unison. The dispenser 12 of the embodiment shown is generally used with a side-by-side cartridge 50, as shown in FIGS. 1 and 5. That is, the cartridge 50 contains two cartridges 50a and 50b adjacent each other such that the first and second material dispensers 54 can be disposed within adjacent cartridges and dispense separate materials simultaneously. The separate materials are generally guided to one of a static and a dynamic mixer (not shown) that enable the materials to be combined.

Such a system comprising the dispenser, the cartridges and the mixer enables materials to thoroughly mix and form an adhesive or mixed material right before or as they are being applied to a surface or area. However, it is noted that the dispenser 12 can be used with a container containing a co-axial container of viscous material. That is, a container containing two components of viscous material arranged coaxially in the container and separated by an annular partition inside the container. In the coaxial container, the two separate materials are also dispensed from their respective containers into the mixer prior to being applied to the specific surface or area. Moreover, if desired, the dispenser 12 can be used with a container containing having only one component of viscous material or any other suitable container.

As shown in FIG. 2, the drive unit 20 accommodates the motor 42 driving through a gear train with a cylindrical pinion gear meshing inside the drive unit 20 with the rack 52 to drive the latter.

The detector or sensor 24 is preferably one of one or more sensors that are configured to determine parameters relating to a current state of use of the dispenser 12 and/or of the cartridge contents stored in the cartridge. For example, the sensor 24 can be a temperature sensor that is arranged at the dispenser 12 and is configured to detect temperature data relating to a temperature of the environment in which the dispenser 12 is used, and/or a humidity sensor that is arranged in the dispenser 12 and is configured to detect humidity data relating to a humidity of the environment in which the dispenser 12 is used.

Moreover, if desired, the sensor 24 can be one of one or more sensors selected from a group including but not limited to a pressure sensor, a location sensor—in particular a GPS sensor—a gyroscopic sensor, a weight sensor, a strain sensor and combinations of the foregoing. In other words, the dispenser 12 can have a single sensor or a plurality of sensors that are configured to sense one or more of the conditions discussed herein.

By the GPS sensor and/or the gyroscopic sensor positional data relating to the position and location of use of the dispenser 12 can be detected and consequently recorded e.g. once this is communicated via the second wireless communication device to the remote device 14 and/or the remote network terminal or server 16.

In one embodiment, the sensor 24 can be disposed adjacent the rack 52 of the first and second material dispensers 54 and/or disposed within the housing 18 and capable of detecting the movement of the material dispensers 54 and/or the rack 52. However, it is noted that the sensor 24 can be disposed in any suitable position. Additionally, sensor 24 can be an optical sensor, sliding calipers or any suitable sensor that can determine the distance and/or speed of the movement of the material dispensers.

In one embodiment, the sensor 24 can be connected to the motor 42 and the controller 28, as illustrated in FIG. 3. Thus, the sensor 24 is capable of determining the speed of the material dispensers 54 based on the speed of the motor 42.

The data from the sensor 24 may then be communicated to the controller 28 for purposes of controlling the speed and or distance of travel of the material dispensers 54. In one embodiment, the sensor 24 enables the controller 28 to determine the speed and distance at which the material dispensers 54 have travelled. However, it is noted that the sensor 24 can be any suitable sensor and not limited to the description provided herein. Regardless of the type of sensor, the data recorded via the sensor 24 is collected and communicated via the second wireless communication device to the remote device 14 and/or the remote network terminal or server 16.

The sensor 24 can also be configured to detect a user id, and/or the dispenser can be configured to record a user id which can then be communicated via the second wireless communication device to the remote device 14 and/or the remote network terminal or server 16. In this way one can track which user carried out each dispensing action.

As stated above, the dispenser 12 includes the receiver/transmitter 26. The receiver/transmitter 26 includes a first receiver 26*a*, a second receiver 26*b* and a transmitter 26*c*. The first receiver 26*a* is capable of receiving information from the cartridge 50. The first receiver 26*a* can be a wireless communication means or device (communicator) that is capable of receiving a signal from an RFID tag or any other suitable device. In other words, the first wireless communication device is configured to receive data from the cartridge when the cartridge is received within the dispenser 12.

The second receiver 26*b* and the transmitter 26*c* can be a single device (e.g., a transceiver) or separate devices. The second receiver 26*b* and transmitter 26*c* can be a second wireless communication means or device (communicator) that is selected from the group of members consisting of: Bluetooth, wireless lan, NFC, zigbee, LTE, UMTS, Z-Wave and infrared, or any other suitable communication means. The wireless communication means or device is configured to transmit data between the dispenser 12 and the remote device 14 or the network computer or server 16. In some embodiments, the first wireless communication device and the second wireless communication device are different and operate in a different manner. Thus, the wireless communication in the first wireless communication system and the second wireless communication system can occur substantially simultaneously and will not result in any crosstalk or miscommunications. However, it is noted that the first and second wireless communication devices can be the same device and operate in the same manner.

As shown schematically in FIG. 3, the dispenser 12 can comprise a controller 28 with a microcontroller 58, a data processing device 60, the bi-directional DC motor driver 61, a torque control 62 for avoiding excess torque that could result in a mechanical breakdown, a battery monitor 64, a temperature monitoring system (TMS) 66 for avoiding excess temperature e.g. in the motor 42, and an on/auto off switch 68.

The controller 28 can also include other conventional components such as a storage device 70, (e.g. a ROM (Read Only Memory) device and a RAM (Random Access Memory) device). The microcomputer 58 of the controller 28 is programmed to (or configured to) control one or more of the drive unit 20, the trigger 32, the on/off mode switch 30, the material dispenser 54, sensor 24, the first receiver 26*a*, the second receiver 26*b*, the transmitter 26*c* and any other element, to make determinations or decisions, as discussed herein.

The memory circuit stores processing results and control programs, such as ones for the drive unit 20, the trigger 32, the on/off mode switch 30, the material dispenser 54, sensor 24, the first receiver 26*a*, the second receiver 26*b*, and the transmitter 26*c* operation that are run by the processor circuit.

The controller 28 is operatively coupled to the drive unit 20, the trigger 32, the on/off mode switch 30, the material dispenser 54, and the sensor 24, the first receiver 26*a*, the second receiver 26*b*, the transmitter 26*c* in a conventional manner. Such a connection enables the controller 28 to monitor and control any of these systems or devices as desired.

The internal RAM of the controller 28 stores statuses of operational flags and various control data.

The internal ROM of the controller 28 stores the information for various operations.

The controller 28 is capable of selectively controlling any of the components of the dispenser 12 in accordance with the control program. It will be apparent to those skilled in the art from this disclosure that the precise structure and algorithms for the controller 28 can be any combination of hardware and software that will carry out the functions of the present invention.

For input to the controller 28, the dispenser 12 comprises the trigger 32, the on/off mode switch 30, and an end-stop switch 72 for indicating an end position of the rack 52. The trigger 32 and the speed control dial 34 can be coupled to potentiometers to control the speed at which the motor 42 or the material dispenser 54 operates. That is, a target speed can be derived from the input of the potentiometers and the corresponding effective voltage for that target speed is determined. This effective voltage can be converted to a pulse length by using the nominal voltage and this signal is delivered to the motor 42.

The voltage applied at the motor 42, like the current applied at the motor 42 can be detected using an appropriate voltage or current sensor 24. The measured voltage and/or current can be collected and communicated via the second wireless communication device to the remote device 14 and/or the remote network terminal or server 16 and from these parameters a dispensing force of each of the material dispensers 54 can be estimated.

The dispenser 12 can be configured in any suitable manner for retraction of the rack 52 and material dispensers 54 for the exchange of the receptacle with the material to be dispensed as is known.

Under normal operation, the operator uses the on/off mode switch 30 to select a first dispensing mode (off) or a second dispensing mode (on). In the first dispensing mode, the operator pulls the trigger 32 to dispense material from the container. Pulling the trigger 32 activates the on/auto off switch 36 to turn the controller 28 on, and activates the control program to reset the storage device 70 and start driving the motor 42. The motor 42 drives the rack 52 and the material dispenser 54 through the gear train and the pinion gear (not shown) whereby material to be dispensed is expelled from the receptacle. As can be understood this information is then stored in the storage device 70 and can be transmitted via the transmitter 26c to the remote device 14 or the network computer or server 16.

As described herein, the dispenser 12 can be remote controlled or remotely monitored. In one embodiment, the dispenser 12 can be controlled by the remote device 14 or the network computer or server 16. The remote device 14 and/or network computer or server 16 can be a control system selected from the group of members consisting of: a mobile phone, a smart phone, a tablet, a smart watch, a personal computer, a portable computer, a microcontroller and an APP installed on at least one of the aforementioned devices, or any other suitable device.

Figure 4:
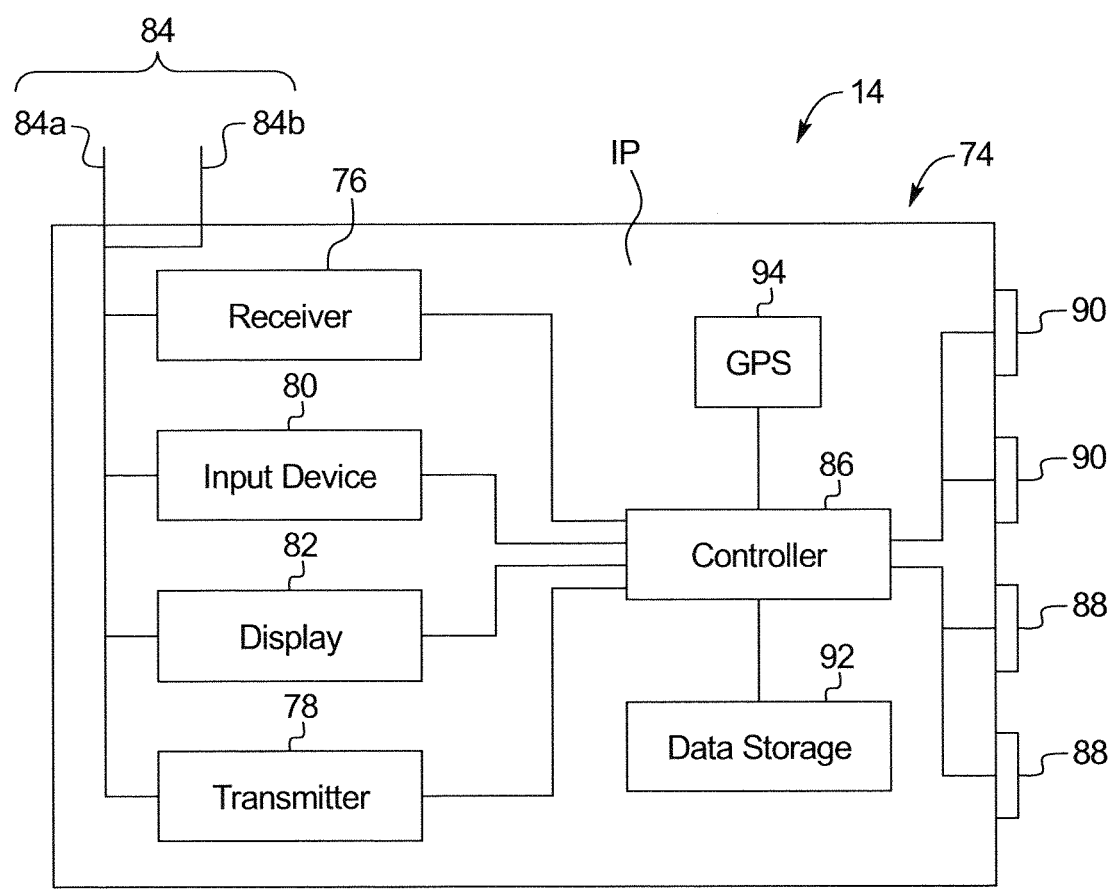
FIG. 4 illustrates a dual cartridge with a RFID for the dispenser of FIG. 2.

As shown in FIG. 4, the remote device 14 can include a housing 74, a receiver 76, a transmitter 78, an input device 80, a display 82, an antenna system 84 and an electronic controller 86.

The remote device 14 can also include a speaker 88 or speakers 88 for the transmission of sound and a microphone 90 or microphones 90 for the reception of sound.

The housing 74 is preferably a plastic or thermoplastic housing or any suitable material for housing the electrical and other components thereof. The housing 74 can be rectangular or any suitable configuration. Moreover, the housing 74 can have a portion thereof for access to the input device 80 and the display 82. Together these elements define an interior portion IP for the electrical components.

The controller 86 is preferably disposed within the interior portion IP of the housing 74 and is an electronic controller. The controller 86 preferably includes a microcomputer having one or more processors with a control program that controls the components of the remote device 14. The controller 86 may include other conventional components such as an input interface circuit, an output interface circuit, and a data storage device (or devices) 92 such as a ROM (Read Only Memory) device and a RAM (Random Access Memory) device.

The microcomputer of the controller 86 is at least programmed to operate in accordance with the flow chart of FIG. 10 as discussed below. It will be apparent to those skilled in the art from this disclosure that the precise structure and algorithms for the controller 86 can be any combination of hardware and software that will carry out the functions of the present invention. Furthermore, the controller 86 can communicate with the other components as discussed herein via, for example, a control area network (CAN) bus or in any other suitable manner as understood in the art.

The controller 86 is operatively coupled to the receiver 76, the transmitter 78, the input device 80, the display 82, the data storage device 92, the speaker 88, the microphone 90, the antenna system 84, and the other types of components in the remote device 14 in any suitable manner as understood in the art, and is programmed to monitor and control these components as discussed herein.

The data storage device 92 can also store processing results and control programs that are run by the controller 86, such as processing results and control programs for the receiver 76, the transmitter 78, the input device 80, the display 82, the data storage device 92, the speaker 88, the microphone 92, the antenna system 84 and any other suitable information.

The data storage device 92 is a computer memory device (i.e., a nonvolatile memory device) and can store system data, as well as any other suitable data. Furthermore, the data storage device 92 can store other types of data, such as data pertaining to parameters of the dispenser 12.

The data storage device 92 further permits a read-out operation of reading out data held in the storage medium in response to an instruction from the controller 86 to, for example, update parameters of the dispenser 12. The information in the data storage device 92 can also be updated by the controller 86 in any suitable manner as discussed herein and as understood in the art.

The remote device 14 can include a location detection system 94, which is configured to determine the location of the remote device 14. In one embodiment, the location detection system 94 is a GPS (global positioning system) device. That is, the location detection system 94 can be a satellite-based radio navigation device that enables the remote device 14 to locate the remote device 14.

The microphone 90 is disposed in any suitable place and can be any suitable microphone 90 configured to receive sound. As can be understood, the microphone 90 can receive sound in the form of voice from the user and is in electrical communication with the controller 86. The sound is converted to electrical signals that are then processed by the controller 86 and if desired transmitted by the transmitter 78 and/or stored in the data storage device 92.

The speaker 88 is disposed in any suitable place and can be any suitable speaker 88 configured to transmit sound. The speaker 88 is in electrical communication with the controller 86. As can be understood, the speaker 88 can transmit sound in the form of voice to the user, or any other suitable sound as in known in the art. In one embodiment, the speaker can produce an audible sound received by the receiver 76, or an audible sound produced by the controller 86, as one of ordinary skill would understand.

The antenna system 84 can be any suitable antenna system 84 for transmission and reception of a wireless (e.g., cellular) signal. The antenna system 84 can be a single, dual purpose (send and receive) antenna system 84, or there can be two separate antennas. A first antenna system 84*a* to send signals and a second antenna system 84*b* to receive signals. As can be understood, the antenna system 84 or antennas can be any suitable antenna or plurality of antennas. The antenna system 84 can receive signals from other devices, computers, portable communication devices, or any other type of device wirelessly. The antenna system 84 can receive signals through a cellular network or directly from another device in any suitable manner.

The input device 80 can be any suitable input device 80, and is in electrical communication with the controller 86. For example, the input device 80 can be a keyboard that enables a user to input information and commands into the remote device 14 or a button that operates aspects of the remote device 14. The keyboard can be an electronic digital keyboard or a physical keyboard with buttons or keys. Additionally, the input device 80 can be voice commands hand or finger commands, a button or stylus or pen input.

The display 82 can be any suitable display 82 that would enable any desired or suitable data to be displayed. For example, the display 82 can be a transparent screen that is configured to display the information input by the user or data received by the receiver 76. The display 82 can dispenser 12 data, user location, the location of dispensers 12 or any suitable information.

The receiver 76 and the transmitter 78 can be any suitable receiver 76 and transmitter 78 desired. In one embodiment the receiver 76 and the transmitter 78 are one device (i.e., a transceiver). In another embodiment, the receiver 76 and the transmitter 78 are separate devices.

The receiver 76 and transmitter 78 are configured to receive and transmit wireless signals to and from the remote device 14. The receiver 76 and transmitter 78 are electrically connected to the controller 86 and to the antenna system 84. The receiver 76 and transmitter 78 can receive and transmit signals to and from other devices (e.g., dispensers 12), computers (e.g., network computer and server 16), or other devices wirelessly. The receiver 76 and transmitter 78 can receive and transmit signals through a cellular network or directly from another device through the antenna system 84 in any suitable manner.

The network terminal or server 16 can be a control system or any suitable system, and can be offsite or remote, if desired. The network terminal or server 16 can be a conventional computer or server 16 capable of sending and/or receiving information through a network, such as the internet, or directly from the dispenser 12 or remote device 14 in any suitable manner. The network terminal or server 16 can include a storage device configured to store information related to the dispenser 12 and/or remote device 14 and send requests or information to the remote device 14. For example, the network terminal or server 16 can be a supplier that monitors the cartridge information and when new cartridges are needed, supply new cartridges. In other words, the cartridge can include information such as batch number that would inform the supplier when the cartridges are running low.

As shown in FIG. 5, the cartridge 50 generally used is a side-by-side cartridge. That is, the cartridge 50 contains two cartridges 50*a* and 50*b* adjacent each other such that the first and second material dispensers 54 can be disposed within adjacent cartridges 50*a* and 50*b* and dispense separate materials simultaneously in a manner known per se via the outlet using the piston (both not shown) in a manner known per say. Such a system enables materials to thoroughly mix and form an adhesive or mixed material right before or as they are being applied to a surface or area via a static or dynamic mixer (not shown) that is attachable to the cartridge.

However, it is noted that the dispenser 12 can be used with a container containing a co-axial container of viscous material. That is, a container containing two components of viscous material arranged coaxially in the container and separated by an annular partition inside the container. In the coaxial container, the two separate materials are also dispensed from their respective containers into a mixer prior to being applied to the specific surface or area. Moreover, if desired, the dispenser 12 can be used with a container containing only one component of viscous material or any other suitable container.

At least one of the cartridges includes a radio-frequency identification (RFID) tag 94. The RFID tag 94 can contain electronically-stored information that can be communicated to the dispenser 12, in particular, to the first receiver 26*a* in the dispenser 12.

The RFID tag 94 can include information about the cartridges 50*a* and 50*b* such as the materials in the cartridges 50*a* and 50*b*, the production date, the batch number, the filing date, ADM information, the expiration date and/or any suitable information relative to the cartridges 50*a* and 50*b*.

It is noted that while an RFID tag is the preferred embodiment, the cartridge 50 can have any type of system that would enable communication of information with the dispenser 12 or any other system.

Figure 6:
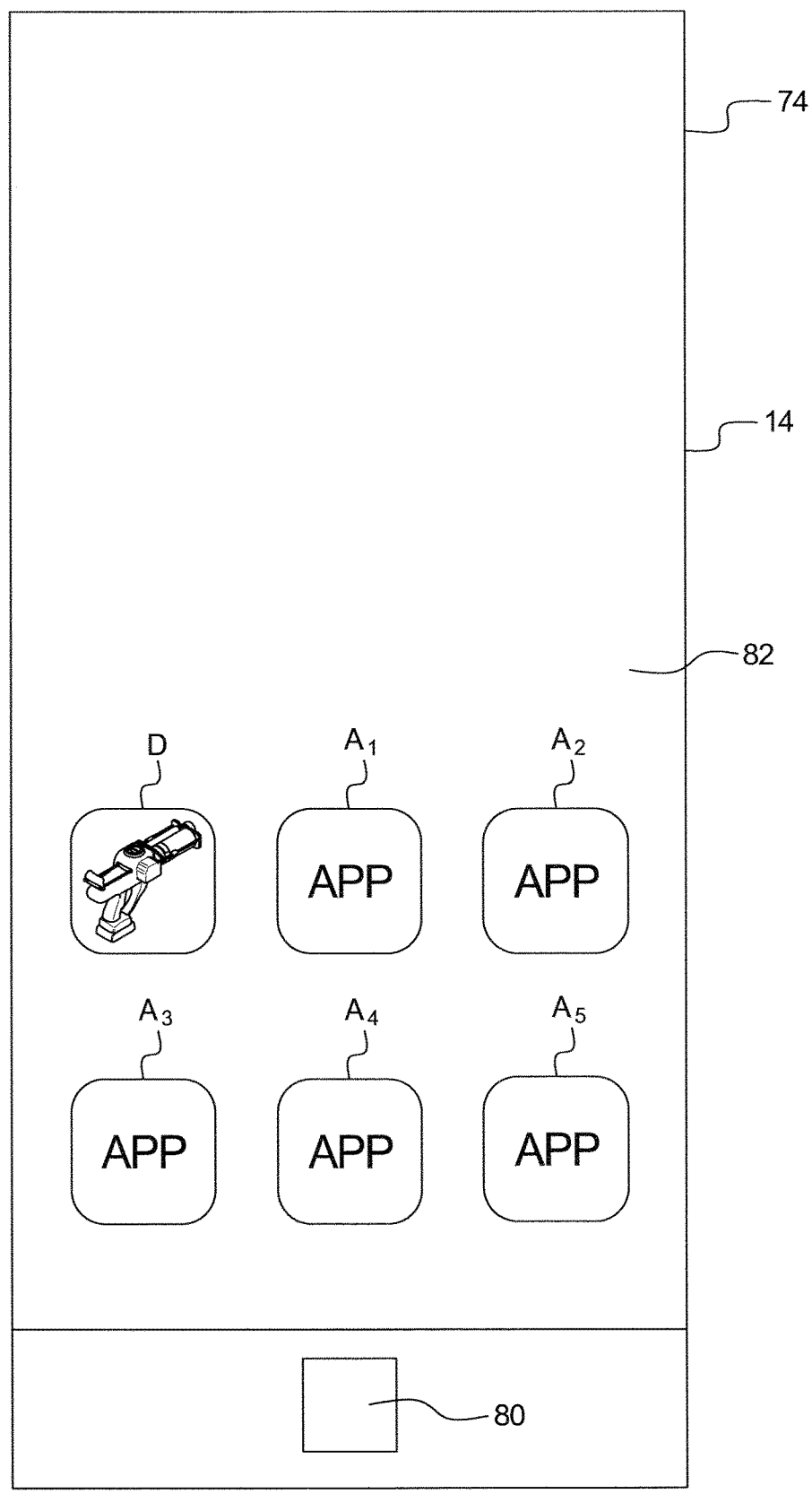
FIG. 6 is the remote device of FIG. 5 showing the capability of selecting the dispensing control system.
Figure 7:
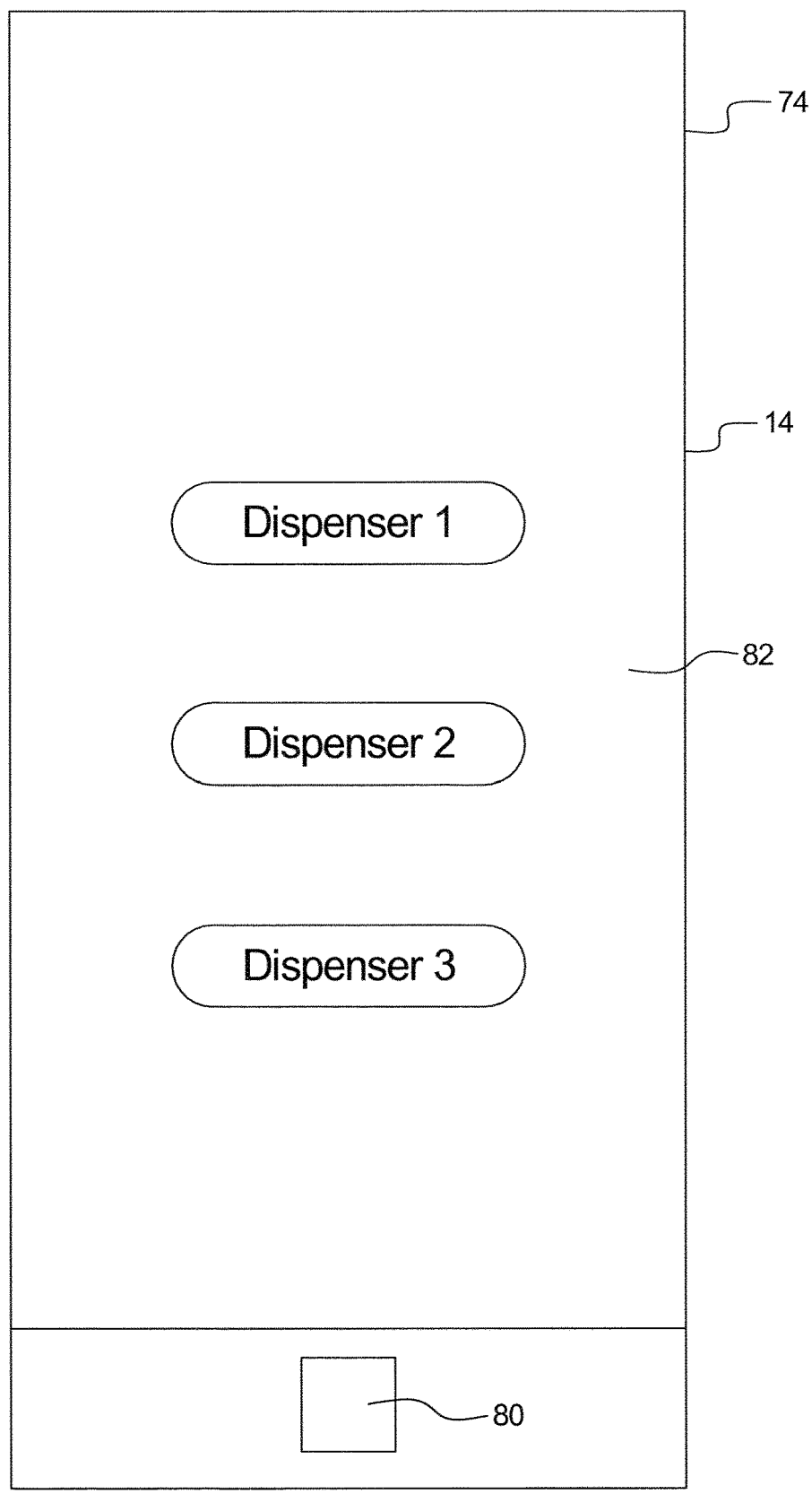
FIG. 7 is the remote device of FIG. 5 illustrating the ability to select one of a plurality of dispensing devices.
Figure 8:
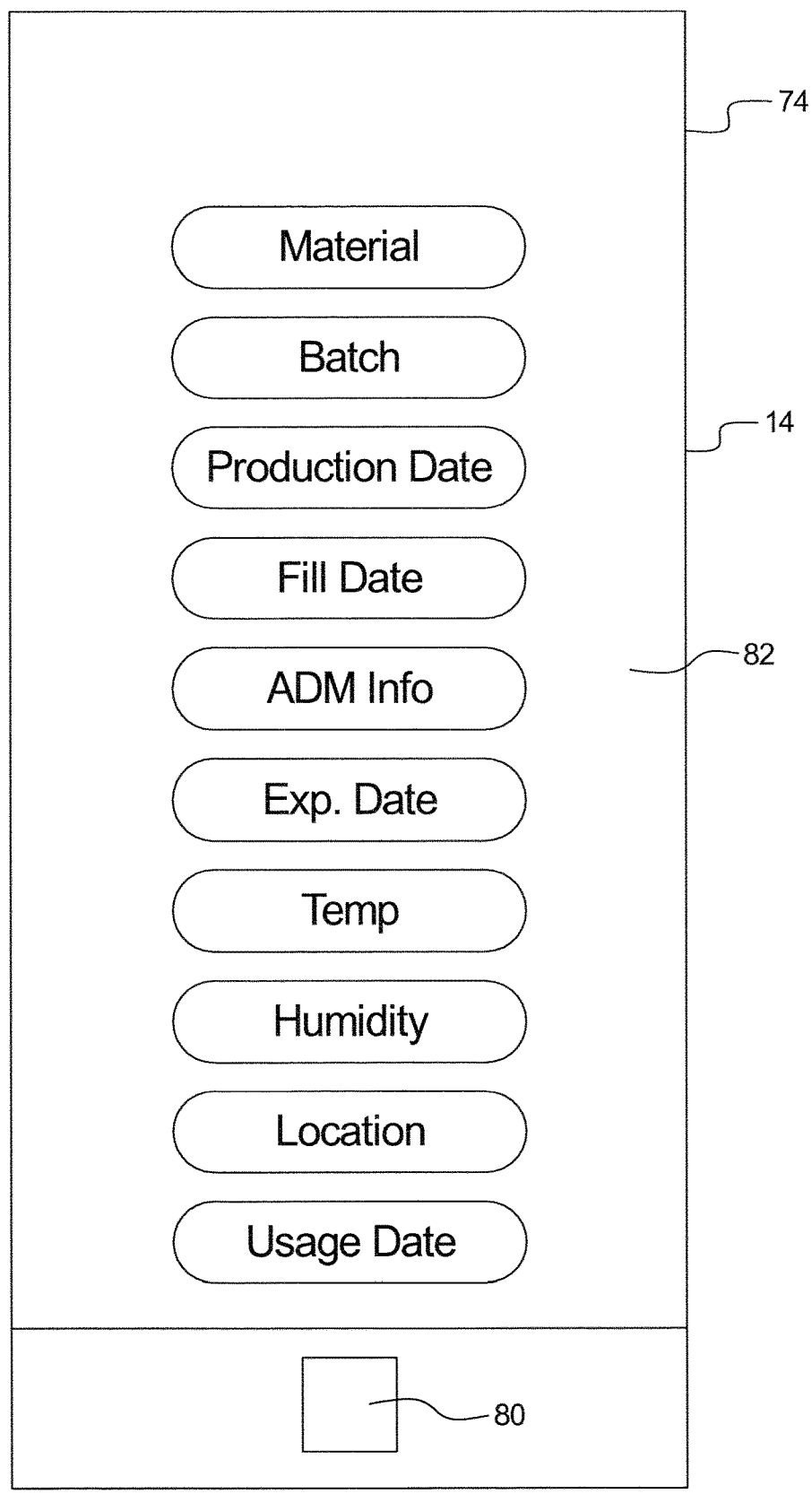
FIG. 8 is the remote device of FIG. 5 illustrating a display of information from the dispenser of FIG. 2.

Turning to FIGS. 6-8 the operation of the remote device 14 will be discussed. As shown in FIG. 6, the remote device 14 can be a smart phone or tablet. In a manner known per se the smart phone or tablet comprises a plurality of apps A1-A5 and a dispenser app D which are respectively downloaded thereon. When a user desires monitoring of dispensers 12 or control of the parameters on a dispenser 12, the dispenser app D can be selected and started.

Moreover, a readable code can be stored at or in the mixer, such as a code stored at an RFID Tag, a hologram, a visual mark, an NFC tag or the like. The dispenser 12 can then comprise a further sensor 24 that is configured to read the readable code. The code can indicate at least one of a type of mixing tip, a manufacturer of the mixing tip, a date of production of the mixing tip, a length of the mixing tip, a diameter of the mixing tip, a size of the mixing tip and a list of materials compliant with the mixing tip. The information stored at the mixer can also be communicated via the second wireless communication device to the remote device 14 and/or the remote network terminal or server 16. A check can be made using the first controller 28 present at the dispenser and/or the second controller 86 of the remote device, whether the mixer installed at the cartridge 50 is suitable for use with the material stored in the cartridge.

The reason for this is that different size and shapes of mixers exist which are adapted for use with the specific material stored in the cartridge 50. If the wrong mixer is used then the desired mixing efficiency can be significantly impaired. The mixing efficiency is namely a balance between low waste volume remaining in the mixer, and a good mixing quality. As can be understood, the devices (e.g., dispensers 12) can be at one jobsite or at separate and distinct jobsites or a combination thereof. Once the app is selected, a list of available devices to control and/or monitor is displayed. For example, as shown in FIG. 7, three separate dispensers 12 are displayed (Dispenser 1, Dispenser 2, Dispenser 3).

One of the dispensers, e.g., Dispenser 1, can be selected. As shown in FIG. 8, the system then displays parameters of the selected dispenser 12. The parameters can be any information desired. For example, the parameters can include information pertaining to the current cartridge 50 installed in the dispenser 12 (e.g., the production date, the batch number, the filing date, ADM information, the expiration date, etc.) and/or to the information currently detected by the sensors 24 (e.g., temperature, pressure, first dispensing mode activated, second dispensing mode activated, low or full battery charge, overload (torque), high temperature, end-stop switch activated, etc.) or any other suitable information.

The user can then choose a parameter to view and/or adjust as discussed herein. The parameter information can be stored in the storage device 92, if desired.

Moreover, this information can be sent by the remote device 14 (or directly from the dispenser 12) to the remote terminal or server 16 (e.g., the cloud). Thus, the information can be monitored and analyzed either in real time or at a later point in time e.g. for the purpose of quality control. For example, an understanding of the environmental parameters on the materials in the cartridges can be analyzed, the status of supplies (e.g. the shelf life of the current cartridge 50) can be analyzed and monitored, or any other suitable aspect of the dispenser 12 and/or cartridges 50a and 50b can be analyzed and monitored.

Figure 9:
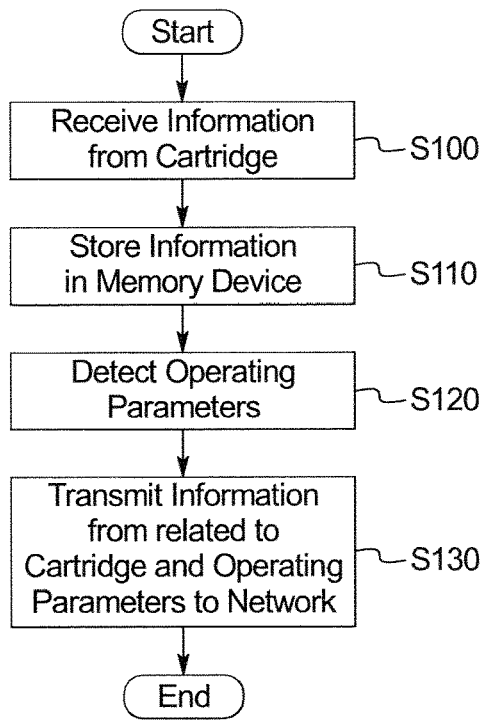
FIG. 9 is a flow chart illustrating the process of receiving and transmitting information from the dispensing device to the network.

FIG. 9 illustrates the communication process between the cartridge 50 and the dispenser 12. In step S100, after the cartridge has been inserted into the dispenser 12, the information on the RFID tag 94 of the cartridge 50b is transmitted such that it is received by the first receiver 26a in the dispenser 12. As discussed herein, this information can include the production date, the batch number, the filing date, ADM information, the expiration date, etc. of the cartridges, or any other suitable information. This information is then stored in the storage device 70 on the dispenser 12 in step S110.

The sensor 24 (or sensors) then detects operating parameters. As discussed herein the sensors 24, in step S120, can detect at least one of temperature, pressure, first dispensing mode activated, a second dispensing mode activated, low or full battery charge, overload (torque), high temperature, end-stop switch activated, etc.

Moreover, the operating parameters detected can include an error log, a usage log, i.e. the amount of material dispensed, the time of dispensing, the material dispensed, a speed of dispensing, conditions of dispensing, location of dispenser 12, worker identification, time and date of operation, job type or description or any other suitable information.

Generally speaking any information on the dispenser 12, the cartridge 50, the state of use and/or the environment of use that is available at the time of use of the dispenser 12 can be compiled over time of use of the dispenser 12 or entered into the dispenser 12 or be produced and stored in the dispenser 12 in any suitable manner.

This information can then be transmitted, in step S130 by the transmitter 26c to the network (e.g., remote device 14 and/or the network terminal or server 16). As can be understood, the transmitter 26b is configured to communicate parameters of a current state of use of the dispenser 12 and/or parameters relating to the environment of use of the dispenser 12 between the dispenser 12 and the remote device 14 and/or the network computer or server 16, and/or parameters relating to the contents of the cartridge 50 that are communicated between the cartridge 50 and the dispenser 12 via the RFID tag 94 and the first receiver 26a.

Figure 10:
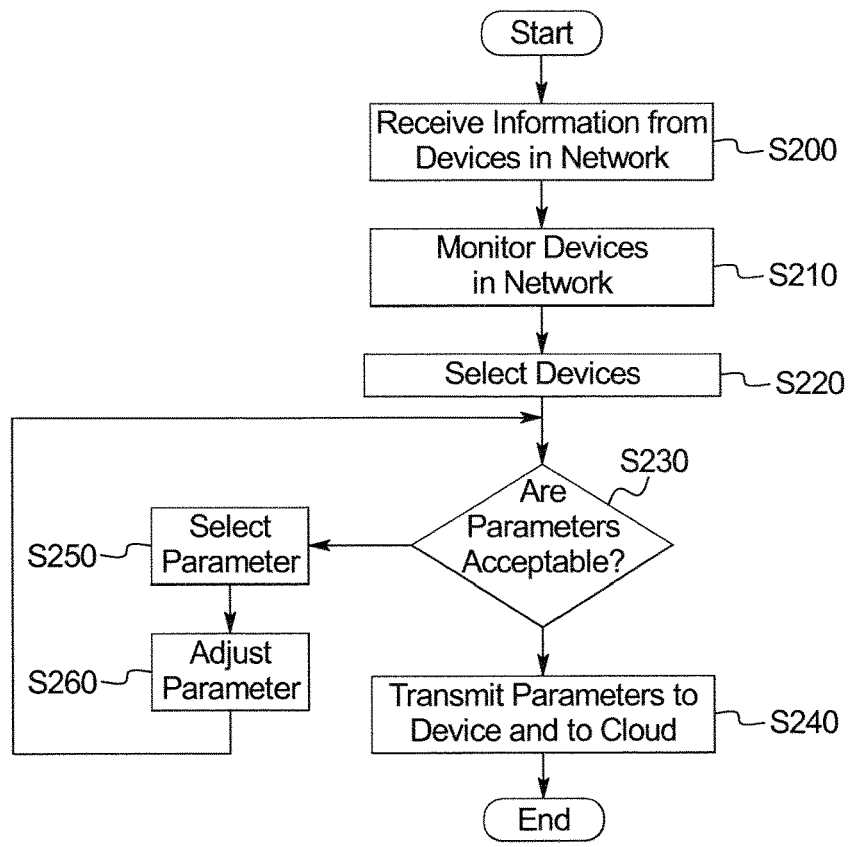
FIG. 10 is a flow chart illustrating the process of remotely adjusting the parameters of the dispensing device.

FIG. 10 is a flow chart illustrating the operation of the remote device 14. As shown in step S200, information is received by the receiver 76 from any device (dispensers 12) in the network. For example, as shown in FIG. 7 a plurality of dispensers are provided. In particular three dispensers are provided that may transmit information to the remote device 14. The remote device 14 can then monitor the information of each of the devices in the network in step S210.

In step S220, the user or the controller 86 can select the dispenser 12. In other words, the remote device 14 can automatically monitor and select individual dispensers 12. Alternatively, a user can monitor and select individual dispensers 12.

The parameters for a specific device (dispenser 12) can then be reviewed to determine if they are acceptable in step S230. For example, the status of the materials in the cartridges 50a and 50b can be reviewed and analyzed, or the status and condition of the dispenser 12 can be analyzed.

If the parameters are acceptable, then the parameters can be transmitted by the transmitter 78 to the cloud (e.g., network computer or server 16) and to the device (dispenser 12) in step S240. Thus, the remote device 14 is configured to asynchronously communicate the data (information) between the remote device 14 and the cloud (e.g., network computer or server 16). When transmitted to the cloud, the information can be correlated for others to review and analyze, the information can be reviewed and analyzed by operating managers to determine user log entries, the information can reflect shop conditions. For example, ambient conditions (temperature, humidity, etc.) can influence motor current without increasing motor RPMs.

Turning back to step S230, if the parameters are determined to be unacceptable, then the app (i.e., the user or the controller 86) can select a parameter in step S250 and adjust the parameter in step S260. For example, dispensing modes can be changed, dispensing speed can be altered, limit stops can be altered, or any suitable parameter can be modified or changed.

This information can be transmitted by the transmitter 78 of the remote device 14 and received by the second receiver 26b in the dispenser 12. Thus, the information (data) communicated between the remote device 14 and the dispenser 12 comprises operating data by which an operation of the dispenser 12 can be adapted and/or controlled in view of data transmitted between the cartridge 50 and the dispenser 12.

Additionally, the remote device 14 can transmit information that terminates the operation of the dispenser 12. For example, if usage is unauthorized or if the materials are expired or any other parameter appears to be unacceptable to the user of the remote device 14 or the controller 86 of the remote device 14 the operation of the dispenser 12 can be terminated.

It is noted that the parameters can be changed or the dispenser 12 can be stopped by the user of the remote device 14 or automatically by the controller 86 of the remote device 14 based on present information. Thus, the controller 86 of the remote device 14 can cause the transmitter 78 to transmit instructions for dispensing the material in the cartridge 50 to the dispensing device 12 based on information input into the input device 80 by the user or by any other action by the user of the remote device 14.

Alternatively, the controller 86 can automatically change parameters of the dispenser or stop operation of the dispenser based on preprogrammed/predetermined information. Accordingly, as can be understood, the information (data) communicated between the remote device 14 and the dispenser 12 comprises operating data by which an operation of the dispenser 12 can be adapted and/or controlled in view of data transmitted between the cartridge 50 and the dispenser 12.

As can be understood, FIG. 10 illustrates the process for a computer program product. Thus, in one embodiment, the remote device 14 includes a computer program embodied on a non-transitory computer-readable medium (e.g., data storage device 92) for controlling and operating the dispensing device 12, the computer program, when executed by the controller 86, is configured to monitor information received from the transmitter 26c on the dispensing device 12, the information related to cartridge 50 disposed in the dispensing device 12, configured to cause the information related to the cartridge 50 to be transmitted to a remote server 16, and configured to cause instructions to be transmitted to the dispensing device 12 based on the information related to the cartridge 50, the instructions including information related to dispensing a material in the cartridge 50.

Figure 11:
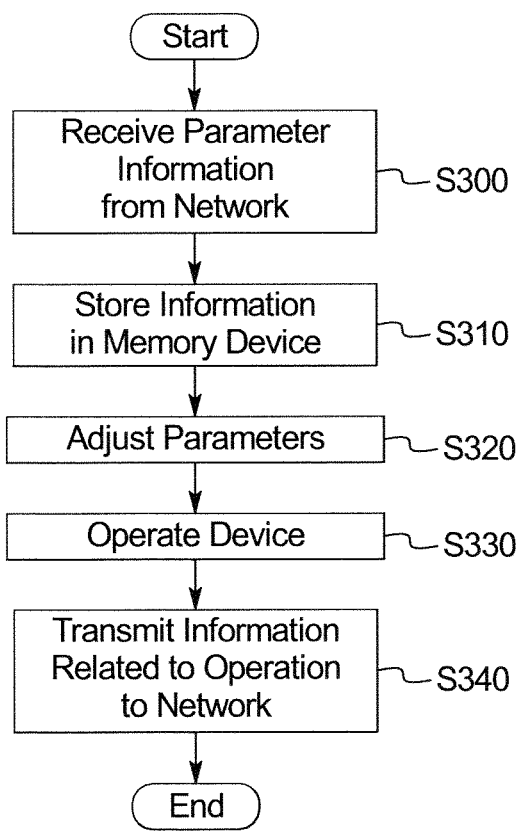
FIG. 11 is a flow chart illustrating the process of remotely adjusting parameters of the dispensing device.

FIG. 11 is a flow chart illustrating the reception of the information by the dispenser 12. In step S300, the information (e.g., parameter change information or stop instructions or any other suitable information) from the remote device 14 or the network computer or server 16 (cloud) is received by the second receiver 26b in the dispenser 12. This information is stored in the memory storage device 70 in step S310.

Accordingly, based on the information from the sensor 24 and/or the adjusted parameters, the dispenser 12 can automatically apply the proper mixing behavior for the material and environmental considerations. In step S320, the dispenser 12 adjusts the parameters based on instructions from the remote device 14. In step S330 the dispenser 12 is then operated, and the updated parameters and additional information detected by the sensors 24 is transmitted to the remote device 14 and/or the cloud using the transmitter in step S340.

Accordingly, the embodiments described herein have many benefits and advantages. The user and/or system 10 can (manually or automatically) confirm that cartridges 50 that are in the supply chain/distribution channels are validated and verified as original on the basis of the information provided by the cartridge 50 currently installed at the dispenser 12. The system can enable automatic journaling of adhesive activities e.g. Aerospace industries. Each use of the dispenser 12 can create a data log with worker, job name, cartridge number, adhesive type, duration of dispensing, mixing and dispensing machine data, etc. which can be uploaded to the cloud (e.g., network computer or server 16) or the remote device 14.

The above information can be supplemented with data recorded by the sensors 24. For example, if it is decided at a later point in time that the material stored in the cartridge 50 should only be applied at temperatures within a range of e.g. 10 to 25° C. or at certain humidity levels to achieve the best results for the respective application, one can then track each precise application of the material to see if it was actually applied at the correct temperature. In this way possible material faults that arise in the application can be excluded if it is determined that the material was applied at the correct temperature.

The sensors 24 can detect and alert an operator of the dispenser 12 or the remote device 14 user of any obstruction of the cartridge 50, exceeding of threshold on time elapsed after cartridge 50 has been started or other malfunction locally. This alert can be performed at the dispenser 12 with the LED indicator 44 or through an alert in the app on the remote device 14 or directly through to the network computer or server 16. The system 10 can alert sales distribution channels, via the cloud or the network computer or server 16 that cartridges 50 are nearing expiration data to enable in time sell-off promotions and avoid scrap/inventory loss.

The system 10 can enable generation of transparent invoices based on actual usage data of the material which can be consumed for invoicing by the workshop invoicing staff. The information received from the cartridges and the dispenser 12 can be combined into data and transmitted such that reports can be developed showing worker, company/location, and asset used for adhesive job while also showing usage and cartridge attributes.

The information recorded by the sensors 24 about the dispenser 12 and the materials stored in the cartridge 50 can also be correlated to see if dispensing parameters, such as the speed of dispensing need adapting to improve the functionality of the dispenser 12 for specific materials stored in the cartridge 50.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiments, directional terms such as transverse, as well as any other similar directional terms refer to those directions of the dispensing control system. Accordingly, these terms, as utilized to describe the present invention should be interpreted relative to the dispensing control system.

The term "configured" as used herein to describe a component, section or part of a device that includes structure that is constructed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

The invention claimed is:

1. A dispensing control system, comprising:
a remote device including a controller; and
a dispensing device including a dispenser comprising one or more pushrods and an actuation mechanism configured to entrain the one or more pushrods in a direction of a cartridge to actuate one or more pistons arranged within the cartridge and configured to dispense material from the cartridge when the cartridge is disposed in the dispensing device, a first wireless communicator that is configured to transmit data between said cartridge when received within the dispenser and the dispenser, the first wireless communicator comprising a first receiver arranged at the dispenser and configured to receive information related to the cartridge, with the information being stored at the cartridge, and a second wireless communicator configured to transmit data between the dispenser and the controller of the remote device, the second wireless communicator comprising a transmitter configured to transmit the information related to the cartridge, and an electronic controller configured to cause the transmitter of the dispensing device to transmit the information related to the cartridge,
the remote device further comprising a receiver and a transmitter of the second wireless communicator, the receiver of the remote device being configured to receive the information related to the cartridge, the controller of the remote device being configured to monitor the information related to the cartridge and to cause the transmitter of the remote device to transmit the information related to the cartridge to a remote server, the first receiver is configured to receive a signal different from a signal received by the remote device.

2. The dispensing control system according to claim 1, wherein the first wireless communicator is configured to transmit and receive data using a different communication standard as the second wireless communicator.

3. The dispensing control system according to claim 1, wherein the first receiver of the first wireless communicator is configured to receive one of an RFID signal an NFC signal a QR code and a visual code.

4. The dispensing control system according to claim 1, wherein the cartridge includes a radio-frequency (RFID) tag as part of the first wireless communicator.

5. The dispensing control system according to claim 1, wherein the controller of the remote device is configured to cause the transmitter of the remote device to transmit instructions for dispensing the material in the cartridge to the dispensing device based on the information related to the cartridge is capable of displaying information relevant to a user, including at least a dispensing speed and dispensing ratios.

6. The dispensing control system according to claim 1, wherein the remote device includes an input device and the controller of the remote device is configured to cause the transmitter of the remote device to transmit instructions for dispensing the material in the cartridge to the dispensing device based on information input into the input device.

7. The dispensing control system according to claim 1, further comprising a second receiver configured to communicate with the remote device, the second receiver configured to receive a signal from at least one of the following signal types: Bluetooth, wireless lan, NFC, zigbee, LTE, UMTS, Z-Wave and infrared.

8. The dispensing control system according to claim 7, wherein the second receiver is arranged at or in the dispensing device.

9. The dispensing control system according to claim 8 wherein the second receiver is arranged in or at a housing of the dispensing device, with the housing also accommodating the actuation mechanism configured to entrain the one or more pushrods.

10. The dispensing control system according to claim 8, wherein a circuit board of the first receiver of the first wireless communicator and a circuit board of the second receiver are arranged in the housing.

11. The dispensing control system according to claim 10, wherein the circuit board of the first receiver and the circuit board of the second receiver are separate from one another.

12. The dispensing control system according to claim 10, wherein the circuit board of the first receiver and the circuit board of the second receiver are formed by a common circuit board.

13. The dispensing control system according to claim 12, wherein the common circuit board also comprises a circuit board of the actuation mechanism.

14. The dispensing control system according to claim 1, wherein the receiver of the remote device is configured to receive information from the remote server and the transmitter of the remote device is configured to transmit the information received from the remote server to the dispensing device.

15. The dispensing control system according to claim 1, further comprising one or more sensors configured to detect parameters relating to a current state of use of the dispenser or of cartridge contents stored in the cartridge.

16. The dispensing control system according to claim 15, wherein the one or more sensor is at least one of a temperature sensor arranged at the dispenser and configured to detect temperature data relating to a temperature of an environment in which the dispenser is used, a humidity sensor arranged in the dispenser and configured to detect humidity data relating to a humidity of the environment in which the dispenser is used, a pressure sensor, a location sensor, a gyroscopic sensor, a weight sensor, a strain sensor or a combination thereof.

17. The dispensing control system according to claim 15, wherein the dispenser includes first and second material dispensers, and the sensor is disposed adjacent a rack for the first and second material dispensers or is disposed within the housing and is capable of detecting a movement of the first and second material dispensers or of the rack.

18. The dispensing control system according to claim 15, wherein the sensor is one of an optical sensor, sliding calipers or is capable of determining the distance or speed of movement of the dispenser.

19. The dispensing control system according to claim 15, wherein the sensor is connected to a motor and the controller to determine a speed of the dispenser based on a speed of the motor.

20. The dispensing control system according to claim 19, wherein data from the sensor is capable of being communicated to the controller to control the speed or distance of travel of the dispenser.

21. The dispensing control system according to claim 15, wherein the parameters relating to the current state of use of the dispenser or of the cartridge contents stored in the cartridge are recorded via the sensor and are collected and communicated via the second wireless communicator to the remote device or a remote network terminal or the server.

22. The dispensing control system according to claim 15, wherein the parameters relating to the current state of use of the dispenser are selected from the group of members consisting of cartridge information, environmental conditions, dispensing information, speed of the pistons, ratio of velocities of the pistons, a voltage of a motor, a maximum voltage applied at the motor, a current of the motor, a force of the dispenser and a combination thereof.

23. A method of controlling a dispensing device, the dispensing device comprising one or more pushrods and an actuation mechanism configured to entrain the one or more pushrods in the direction of a cartridge to actuate one or more pistons arranged within the cartridge for dispensing material from the cartridge disposed in the dispensing device, the method comprising:
receiving information with a first receiver on the dispensing device by a first wireless communicator, the information related to the cartridge disposed in the dispensing device;
transmitting, via a first transmitter, the information related to the cartridge to a second receiver on a remote handheld device via a second wireless communicator; and
transmitting, via a second transmitter, the information related to the cartridge from the remote handheld device to a remote server, the first receiver configured to receive a signal different from a signal received by the remote device.

24. The method of controlling a dispensing device according to claim 23, wherein the receiving information with the first receiver includes receiving information via a first signal, and the transmitting the information related to the cartridge to the second receiver includes transmitting via a second signal, the first and second signals being different.

25. The method of controlling a dispensing device according to claim 23, wherein the first signal is an RFID signal.

26. The method of controlling a dispensing device according claim 23, wherein the second signal is at least one of the following signal types: Bluetooth, wireless lan, NFC, zigbee, LTE, UMTS, Z-Wave and infrared.

27. The method of controlling a dispensing device according to claim 23, further comprising transmitting, with the second transmitter, from the remote device to the dispensing device instructions for dispensing the material in the cartridge based on the information related to the cartridge.

28. The method of controlling a dispensing device according to claim 27, wherein the information related to the cartridge further includes at least one of temperature, humidity and a predetermined mixer motor RPM, speed of push rods, and pattern of dispensing distance travelled by the push rods to calculate a volume dispensed.

29. The method of controlling a dispensing device according claim 23, further comprising inputting into the remote device, via an input device, instructions for dispensing the material in the cartridge, and transmitting, with the second transmitter, the instructions to the dispensing device.

30. The method of controlling a dispensing device according to claim 23, further comprising receiving information from the remote server with the second receiver and transmitting, with the second transmitter, the information received from the remote server to the dispensing device.

31. The method of controlling a dispensing device according to claim 23, further comprising detecting parameters relating to a current state of use of the dispenser or of the cartridge contents stored in the cartridge via one or more sensors.

32. The of controlling a dispensing device according to claim 31, wherein the one or more sensors are at least one of a temperature sensor arranged at the dispenser and configured to detect temperature data relating to a temperature of an environment in which the dispenser is used, a humidity sensor arranged in the dispenser and configured to detect humidity data relating to a humidity of the environment in which the dispenser is used, a pressure sensor, a location sensor, a gyroscopic sensor, a weight sensor, a strain sensor and a combination thereof.

33. The method of controlling a dispensing device according to claim 31,
wherein the dispending device includes a first and second material dispensers, and the sensor is disposed adjacent a rack of the first and second material dispensers or is disposed within the housing and is capable of detecting a movement of the first and second material dispensers or of the rack.

34. The method of controlling a dispensing device according to claim 31,
wherein the sensor is one of an optical sensor, sliding calipers or is capable of determining a distance or speed of movement of the dispenser.

35. The method of controlling a dispensing device according to claim 31,
wherein the sensor is connected to a motor and the controller to determine a speed of dispenser based on a speed of the motor.

36. The method of controlling a dispensing device according to claim 35,
wherein data from the sensor can be communicated to the controller for controlling a speed or distance of travel of the dispenser.

37. The method of controlling a dispensing device according to claim 31,
wherein the parameters relating to the current state of use of the dispenser or of the cartridge contents stored in the cartridge are recorded via the sensor and are collected and communicated via the second wireless communicator to the remote device or a remote network terminal or the server.

38. A computer program embodied on a non-transitory computer-readable medium for controlling and operating a dispensing device in accordance with claim 1, the computer program, when executed by the electronic controller, is configured to monitor the information received from the transmitter on the dispensing device, the information related to the cartridge disposed in the dispensing device, configured to cause the information related to the cartridge to be transmitted to the remote server, and configured to cause instructions to be transmitted to the dispensing device based on the information related to the cartridge, the instructions including information related to dispensing a material in the cartridge.

39. The computer program embodied on the non-transitory computer-readable medium according to claim 38, wherein the information received from the transmitter on the dispensing device is received as at least one of the following signal types: Bluetooth, wireless lan, NFC, zigbee, LTE, UMTS, Z-Wave and infrared.

40. The computer program embodied on the non-transitory computer-readable medium according to claim 38, wherein the computer program is further configured to cause information input into the remote device, via an input device, to be transmitted to the dispensing device.

41. The computer program embodied on the non-transitory computer-readable medium according to claim 38, wherein the computer program embodied is further configured to receive information from the remote server and configured to cause instructions to be transmitted to the dispensing device based on the information received from the remote server.

42. The computer program embodied on the non-transitory computer-readable medium according to claim 38, wherein the instructions to be transmitted to the dispensing device are based on at least one of temperature, humidity and a predetermined mixer motor RPM of the cartridge.

\* \* \* \* \*